(12) United States Patent
Kiuchi

(10) Patent No.: US 12,273,145 B2
(45) Date of Patent: Apr. 8, 2025

(54) METHOD AND SYSTEM FOR OPTICAL TIMING TRANSFER

(71) Applicant: INTER-UNIVERSITY RESEARCH INSTITUTE CORPORATION NATIONAL INSTITUTES OF NATURAL SCIENCES, Tokyo (JP)

(72) Inventor: Hitoshi Kiuchi, Tokyo (JP)

(73) Assignee: INTER-UNIVERSITY RESEARCH INSTITUTE CORPORATION NATIONAL INSTITUTES OF NATURAL SCIENCES, Tokyo (JP)

( * ) Notice: Subject to any disclaimer, the term of this patent is extended or adjusted under 35 U.S.C. 154(b) by 100 days.

(21) Appl. No.: 18/126,663

(22) Filed: Mar. 27, 2023

(65) Prior Publication Data

US 2023/0318710 A1    Oct. 5, 2023

(30) Foreign Application Priority Data

Mar. 31, 2022    (JP) .................................. 2022-059655

(51) Int. Cl.
*H04B 10/2575* (2013.01)
*H04B 10/071* (2013.01)
(Continued)

(52) U.S. Cl.
CPC ..... *H04B 10/25753* (2013.01); *H04B 10/071* (2013.01); *H04B 10/50577* (2013.01);
(Continued)

(58) Field of Classification Search
CPC .............. H04B 10/25753; H04B 10/54; H04B 10/548; H04Q 2213/13214;
(Continued)

(56) References Cited

U.S. PATENT DOCUMENTS

| 7,680,418 B2 * | 3/2010 | Tsuji ......................... H04L 7/02 398/154 |
| 2006/0093375 A1 * | 5/2006 | Futami ..................... H04J 14/08 398/155 |
| 2018/0246393 A1 * | 8/2018 | Inagaki .................. G06N 10/00 |

FOREIGN PATENT DOCUMENTS

| JP | 2021197606 A | * 12/2021 |
| JP | 2022161150 A | * 10/2022 |

OTHER PUBLICATIONS

Krehlik et al., "ELSTAB-Fiber-Optic Time and Frequency Distribution Technology: A General Characterization and Fundamental Limits", IEEE Transactions on Ultrasonics, Ferroelectrics, and Frequency Control, Jul. 2016, vol. 63, No. 7, p. 993-1004.

* cited by examiner

*Primary Examiner* — Li Liu
(74) *Attorney, Agent, or Firm* — Birch, Stewart, Kolasch & Birch, LLP

(57) ABSTRACT

A forward optical intensity modulation signal, generated by optical intensity-modulating a laser signal using a forward microwave phase modulation signal, is transmitted from a base to a remote station. A backward microwave phase modulation signal, in which frequency of the forward microwave phase modulation signal is changed by demodulating the forward optical intensity modulation signal, is generated, and a backward optical intensity modulation signal, generated by optical intensity-modulating the laser signal using the backward microwave phase modulation signal, is transmitted from the remote station to the base. The backward microwave phase modulation signal is extracted by photoelectric converting the backward optical intensity modulation signal, a round trip timing is extracted by demodulating the backward microwave phase modulation signal, and (Continued)

transmission delay is determined from a difference between the timing and the round trip timing.

10 Claims, 5 Drawing Sheets

(51) Int. Cl.
*H04B 10/50* (2013.01)
*H04B 10/54* (2013.01)
*H04B 10/548* (2013.01)
*H04B 10/67* (2013.01)

(52) U.S. Cl.
CPC ....... *H04B 10/50597* (2013.01); *H04B 10/54* (2013.01); *H04B 10/548* (2013.01); *H04B 10/676* (2013.01); *H04Q 2213/13214* (2013.01); *H04Q 2213/1336* (2013.01); *H04Q 2213/214* (2013.01); *H04Q 2213/36* (2013.01)

(58) Field of Classification Search
CPC ..... H04Q 2213/1336; H04Q 2213/214; H04Q 2213/36
USPC .................................. 398/154–155
See application file for complete search history.

METHOD AND SYSTEM FOR OPTICAL TIMING TRANSFER

BACKGROUND OF THE INVENTION

1. Field of the Invention

The present disclosure relates to a method and a system for optical timing transfer, and more particularly to a method and a system for optical timing signal transmission for a remote station, which is transmitted from a base station to the remote station via an optical fiber.

2. Description of the Related Art

In such fields as high-speed optical communication, deep space exploration and astronomical precision measurement, it is necessary to synchronize timing signals at high precision in a plurality of measurement spots that are quite distant from one another. In order to synchronize such timing signals, highly precise generation and transmission of a timing signal are demanded.

In a case where a base station and a remote station, which are quite distant from each other, are connected via an optical fiber, and a timing signal is transmitted from the base station to the remote station to synchronize the timings, the transmission delay generated on an optical fiber is measured at high precision in advance, and a timing signal for the remote station, which has been advanced by the measured amount of the transmission delay, is transmitted from the base station to the remote station, so as to synchronize the timing signals. This type of technique is described in the following P. Krehlik, L. Sliwczynski, L. Buczek, J. Kolodziej, M. Lipinski, ELSTAB. Fiber-Optic Time and Frequency Distribution Technology: A General Characterization and Fundamental Limits, IEEE Trans on Ultrasonics, Ferroelectrics, and frequency control, (vol. 63, no. 7, pp. 993-1004, July 2016).

SUMMARY OF THE INVENTION

In the conventional method according to the above mentioned in the P. Krehlik, L. Sliwczynski, L. Buczek, J. Kolodziej, M. Lipinski, ELSTAB. Fiber-Optic Time and Frequency Distribution Technology: A General Characterization and Fundamental Limits, IEEE Trans on Ultrasonics, Ferroelectrics, and frequency control, (vol. 63, no. 7, pp. 993-1004, July 2016), timing signals are synchronized as follows.

1. A base station modulates the amplitude of a laser optical signal using a timing signal, so as to generate an amplitude-modulated optical signal.
2. The base station transmits the optical signal to a remote station via an optical fiber.
3. The remote station converts the optical signal, transmitted via the optical fiber, into an electric signal by photoelectric conversion, and extracts the timing signal.
4. The remote station modulates the amplitude of the laser optical signal using the extracted timing signal, and regenerates the optical signal. Here in order to allow the base station to separate the optical signal generated in the base station from the optical signal regenerated in the remote station, the wavelength of the optical signal regenerated in the remote station is set to a different wavelength from the wavelength of the optical signal generated in the base station, so that these optical signals can be separated from each other using an optical filter.
5. The remote station transmits the regenerated optical signal to the base station via the optical fiber.
6. The base station separates and extracts the optical signal transmitted from the remote station using the optical filter, converts the separated and extracted optical signal into an electric signal by photoelectric conversion, and extracts the timing signal.
7. The base station compares the timings of the original timing signal and the timing signal included in the optical signal transmitted from the remote station, and detects a delay generated by the round trip transmission of the optical signal (round trip delay).
8. The base station modulates the amplitude of the laser optical signal by the timing signal for the remote station for which the time equivalent to the transmission delay (½ the round trip delay) has been advanced, and generates an optical signal for synchronizing the remote station.
9. The base station transmits the optical signal for synchronizing the remote station to the remote station via the optical fiber.

In the conventional method, it is necessary to use different wavelengths, respectively, for the optical signal of the forward path from the base station to the remote station, and for the optical signal of the backward path from the remote station to the base station, so that these optical signals can be separated from each other by the optical filter. In this case, the delay amount of the forward path and that of the backward path change depending on the difference of the wavelengths of the optical signals between the forward path and the backward path, due to the influence of the chromatic dispersion in the optical fiber transmission.

Moreover, in the conventional method, the remote station extracts the timing signal from the optical signal from the base station, and regenerates the optical signal by amplitude-modulating the laser optical signal using the extracted timing signal. In this case, depending on the processing in the remote station, the forward path of the optical signal from the base station to the remote station, and the backward path of the optical signal from the remote station to the base station, may become different paths.

For these reasons, it becomes difficult to accurately measure the transmission delay which is generated on the optical signal transmitted via the optical fiber, and to generate a highly precise timing signal for the remote station.

With the foregoing in view, it is an object of the present disclosure to provide a method and a system for precisely measuring a transmission delay generated on an optical signal which is transmitted between a base station and a remote station via an optical fiber, and generating a timing signal for the remote station, which is transmitted from the base station to the remote station via the optical fiber.

A method for generating a timing signal according to the present disclosure is a method for generating a timing signal that is transmitted from a base station to a remote station via an optical fiber. In the base station, this method includes steps of: generating a forward-path microwave phase modulation signal by phase-modulating a first reference microwave signal having a first carrier frequency f1 by using the timing signal; generating a forward-path optical intensity modulation signal by optical intensity-modulating a first laser optical signal having a wavelength $\lambda 1$ by using the forward-path microwave phase modulation signal; and transmitting the forward-path optical intensity modulation signal from the base station to the remote station via the optical fiber. In the remote station, this method includes steps of: performing photoelectric conversion on the forward-path optical intensity modulation signal transmitted from the base station and electrically extracting a forward-path microwave phase modulation signal; generating a backward-path microwave phase modulation signal having a second carrier frequency f2, which is different from the first carrier frequency f1, by using the forward-path microwave phase modulation signal; generating a backward-path optical intensity modulation signal by performing optical intensity modulation on a second laser optical signal having the wavelength λ by using the backward-path microwave phase modulation signal; and transmitting the backward-path optical intensity modulation signal from the remote station to the base station via the optical fiber. Then in the base station, this method further includes steps of: performing photoelectric conversion on the backward-path optical intensity modulation signal and electrically extracting a backward-path microwave phase modulation signal; demodulating the backward-path microwave phase modulation signal and extracting a round trip timing signal; determining a transmission delay from a timing difference between the timing signal and the round trip timing signal; and generating the timing signal for the remote station by advancing the timing signal by an amount of the transmission delay.

In the remote station, the method for generating a timing signal according to the present disclosure, further includes steps of: extracting the timing signal from the forward-path microwave phase modulation signal, and regenerating the first reference microwave signal having the first carrier frequency; generating a second reference microwave signal having the second carrier frequency so as to phase-synchronize with the first reference microwave signal; and generating the backward-path microwave phase modulation signal by phase-modulating the second reference microwave signal by using the timing signal. In the base station, this method further includes steps of: generating the second reference microwave signal having the second carrier frequency; comparing the phase of the backward-path microwave phase modulation signal, which is extracted by performing photoelectric conversion on the backward-path optical intensity modulation signal, with the second reference microwave signal; determining a transmission phase change amount from a round trip phase change amount acquired by the comparison; and generating the timing signal by advancing the timing signal by the amount of the transmission delay and the transmission phase change amount.

A system for generating a timing signal according to the present disclosure is a system for generating a timing signal that is transmitted from a base station to a remote station via an optical fiber. The base station includes: a timing signal generation unit that generates the timing signal and supplies the generated timing signal to a microwave modulator and a timing comparison unit; a microwave generator that generates a first reference microwave signal having a first carrier frequency and supplies the generated first reference microwave signal to a microwave modulator; a microwave modulator that generates a forward-path microwave phase modulation signal by phase-modulating the first reference microwave signal by using the timing signal, and supplies the generated forward-path microwave phase modulation signal to an optical intensity modulator; a first laser light source that generates a first laser optical signal having a wavelength λ1 and supply the generated first laser optical signal to the optical intensity modulator; an optical intensity modulator that generates a forward-path optical intensity modulation signal by optical intensity-modulating the first laser optical signal by using the forward-path microwave phase modulation signal, and supplies the generated forward-path optical intensity modulation signal to a directional coupler; a directional coupler that supplies the forward-path optical intensity modulation signal to the remote station via the optical fiber, separates a backward-path optical intensity modulation signal, which is supplied from the remote station via the optical fiber, from the forward-path optical intensity modulation signal, and supplies the separated backward-path optical intensity modulation signal to a photoelectric convertor; a photoelectric convertor that performs photoelectric conversion on the backward-path optical intensity modulation signal and extracts a backward-path microwave phase modulation signal, and supplies the extracted backward-path microwave phase modulation signal to a microwave demodulator; a microwave demodulator that extracts a round trip timing signal from the backward-path microwave phase modulation signal, and supplies the extracted round trip timing signal to a timing comparison unit; a timing comparison unit that determines a transmission delay from a timing difference between the timing signal and the round trip timing signal and notifies a control unit of the determined transmission delay; and the control unit that performs control, based on the transmission delay. The remote station includes: a directional coupler that separates the forward-path optical intensity modulation signal, which is supplied from the base station via the optical fiber, from the backward-path optical intensity modulation signal, and supplies the separated forward-path optical intensity modulation signal to a photoelectric convertor, and supplies the backward-path optical intensity modulation signal to the remote station via the optical fiber; a photoelectric convertor that performs photoelectric conversion on the forward-path optical intensity modulation signal and extracts the forward-path microwave phase modulation signal, and supplies the extracted forward-path microwave phase modulation signal to a backward-path microwave phase modulation signal generation unit; a backward-path microwave phase modulation signal generation unit that generates a backward-path microwave phase modulation signal having a second carrier frequency, which is different from the first carrier frequency, by using the forward-path microwave phase modulation signal, and supplies the generated backward-path microwave phase modulation signal to an optical intensity modulator; a second laser light source that generates a second laser optical signal having the wavelength λ1 and supply the generated second laser optical signal to the optical intensity modulator; and an optical intensity modulator that generates the backward-path optical intensity modulation signal by optical intensity-modulating the second laser optical signal by using the backward-path microwave phase modulation signal, and supplies the generated backward-path optical intensity modulation signal to the directional coupler. Here the control unit controls the timing signal generation unit, and generates the timing signal for the remote station by advancing the timing signal by an amount of the transmission delay.

In the system for generating a timing signal according to the present disclosure, the backward-path microwave phase modulation signal generator includes a local oscillator and a frequency convertor. The local oscillator generates a local oscillation signal and supplies the generated local oscillation signal to the frequency convertor. The frequency convertor performs frequency conversion by using the local oscillation signal, and generates, from the forward-path microwave phase modulation signal having the first carrier frequency, the backward-path microwave phase modulation signal having the second carrier frequency, which is different from the first carrier frequency.

In the system for generating a timing signal according to the present disclosure, the backward-path microwave phase modulation signal generation unit includes a microwave demodulator, a microwave generator and a microwave modulator. The microwave demodulator extracts the timing signal from the forward-path microwave phase modulation signal, and supplies the extracted timing signal to the microwave modulator. The microwave generator generates a second reference microwave signal having the second carrier frequency, which is different from the first carrier frequency, and supplies the generated second reference microwave signal to the microwave modulator. The microwave modulator phase-modulates the second reference microwave signal by using the timing signal, generates a backward-path microwave phase modulation signal having the second carrier frequency, which is different from the first carrier frequency, and supplies the generated backward-path microwave phase modulation signal to the optical intensity modulator.

In the system for generating a timing signal according to the present disclosure, in the remote station, the microwave demodulator extracts the timing signal from the forward-path microwave phase modulation signal, supplies the extracted timing signal to the microwave modulator, regenerates the first reference microwave signal from the forward-path microwave phase modulation signal, and supplies the regenerated first reference microwave signal to the microwave generator. The microwave generator generates a second reference microwave signal having the second carrier frequency in a state of phase-synchronizing with the first reference microwave signal, by using the first reference microwave signal as a phase-synchronizing signal, and supplies the generated second reference microwave signal to the microwave modulator. The microwave modulator generates the backward-path microwave phase modulation signal by phase-modulating the second reference microwave signal, which is phase-synchronized with the first reference microwave signal, using the timing signal. In the base station, a phase comparison unit is further provided. The microwave generator further generates the second reference microwave signal and supplies the generated second reference microwave signal to the phase comparison unit. The photoelectric convertor further supplies the backward-path microwave phase modulation signal, which is extracted from the backward-path optical intensity modulation signal by photoelectric conversion, to the phase comparison unit. The phase comparison unit calculates a transmission phase change amount from the phase change amount between the second reference microwave signal and the backward-path microwave phase modulation signal, and supplies the calculated transmission phase change amount to the control unit. The control unit controls a timing signal generation unit to advance the timing signal by an amount of transmission delay, controls a microwave generator to advance the first reference microwave signal by the transmission phase change amount, and generates the timing signal for the remote station.

In the system for generating a timing signal according to the present disclosure, the base station includes a filter, of which resonance frequency is set to a second carrier frequency, between the photoelectric convertor and the microwave demodulator. The filter passes the backward-path microwave phase modulation signal having the second carrier frequency extracted from the backward-path optical intensity modulation signal. The remote station includes a filter, of which resonance frequency is set to a first carrier frequency, between the photoelectric convertor and the microwave demodulator, and the filter passes a forward-path microwave phase modulation signal having the first carrier frequency extracted from the forward-path optical intensity modulation signal.

By using the method and the system for generating a timing signal of the present disclosure, the transmission delay generated on the optical signal, which is transmitted between the base station and the remote station via the optical fiber, can be precisely measured, and the timing signal for the remote station, which is transmitted from the base station to the remote station via the optical fiber, can be generated.

DESCRIPTION OF THE PREFERRED EMBODIMENTS

A method and a system for generating a timing signal according to the present disclosure will be described with reference to the drawings.

Embodiment 1

Figure 1:
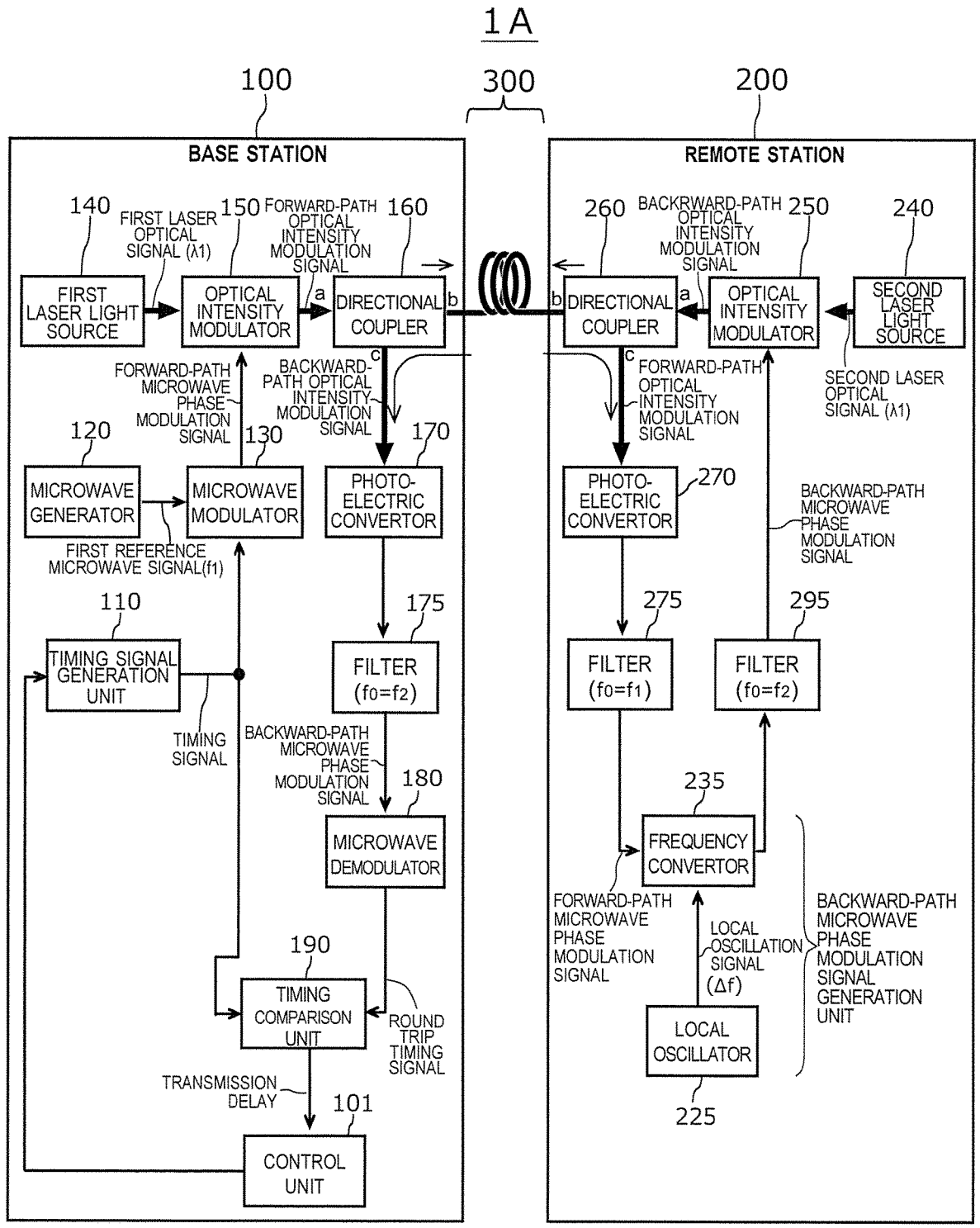
FIG. 1 is a block diagram depicting a configuration of a system according to Embodiment 1.

A configuration of a system 1A according to Embodiment 1 of the present disclosure will be described first with reference to FIG. 1. FIG. 1 is a block diagram depicting the configuration of the system 1A according to Embodiment 1.
Configuration of System 1A The system 1A is mainly constituted of a base station 100, a remote station 200 and an optical fiber 300.

In the base station 100, a control unit 101, a timing signal generation unit 110, a microwave generator 120, a microwave modulator 130, a first laser light source 140, an optical intensity modulator 150, a directional coupler 160, a photoelectric convertor 170, a filter 175, a microwave demodulator 180 and a timing comparison unit 190 are disposed.

In the remote station 200, a local oscillator 225, a frequency convertor 235, a second laser light source 240, an optical intensity modulator 250, a directional coupler 260, a photoelectric convertor 270, a filter 275, and a filter 295 are disposed. Here the local oscillator 225 and the frequency convertor 235 constitute a backward-path microwave phase modulation signal generation unit.

The optical fiber 300 connects the base station 100 and the remote station 200, which are disposed in the measurement spots quite distant from each other, so as to perform optical communication for high-speed optical communication, deep space exploration, astronomical precision measurement, and the like. A number of remote stations 200 need not be one, and a plurality of remote stations 200 may exist.

Operation of Each Component of System 1A

In the base station 100, the control unit 101 performs control to synchronize the timing of the base station 100 and the remote station 200. Each component of the system 1A executes each step of the method of generating the high precision timing signals based on the control of the control unit 101.

In other words, after calculating the transmission delay as described below, the control unit 101, as the timing synchronization control, generates an optical signal for synchronizing the remote station by modulating the laser optical signal using a timing signal which has been advanced by the amount of the transmission delay, and controls each component of the base station 100, so as to supply the optical signal for synchronizing the remote station to the remote station 200 via the optical fiber 300.

The timing signal generation unit 110 generates a precise timing signal having a specific cycle, such as 1 second (1 PPS signal) or 1/10 second (10 PPS signal), and supplies the generated timing signal to the microwave modulator 130 and the timing comparison unit 190.

The microwave generator 120 generates a first reference microwave signal having a first carrier frequency f1, and supplies the generated first reference microwave signal to the microwave modulator 130. In Embodiment 1, the meaning of "microwave" is not limited to what is commonly known as "microwave" having a frequency range of 300 MHz to 300 GHz, but also includes a wave having a frequency range of a short wave (3 MHz to 30 MHz), an ultrashort wave (30 MHz to 300 MHz), and the like. In Embodiment 1, the first reference microwave signal is a reference signal having a single frequency, such as 10 MHz, for example.

The microwave modulator 130 phase-modulates the first reference microwave signal having the first carrier frequency f1 using a baseband signal generated by the timing signal generation unit 110 as the timing signal, and generates a microwave phase modulation signal (hereafter called "forward-path microwave phase modulation signal"). The microwave modulator 130 supplies the generated forward-path microwave phase modulation signal to the optical intensity modulator 150.

The first laser light source 140 generates a first laser optical signal having wavelength λ1 as an optical carrier, and supplies the generated first laser optical signal to the optical intensity modulator 150. In Embodiment 1, the phase of the laser optical signal is not used to measure the transmission delay, hence wavelength stability of the laser optical signal is not that critical. The first laser optical signal from the base station 100 and a later mentioned second laser optical signal from the remote station 200 need not interfere with each other, hence the first laser optical signal and the second laser optical signal need not have a narrow linewidth.

The optical intensity modulator 150 generates an optical intensity modulation signal (hereafter called "forward-path optical intensity modulation signal"), optical intensity-modulating the first laser optical signal using the forward-path microwave phase modulation signal, and inputs the generated forward-path optical intensity modulation signal to a terminal a of the directional coupler 160. "Optical intensity modulation" refers to a modulation method for converting the modulation target signal into the intensity of power of the light. In this optical intensity modulation, the intensity is in proportion to a square of an amplitude, which is an aspect that is different from the case of the amplitude modulation.

The directional coupler 160 separates the forward-path optical intensity modulation signal from an optical intensity modulation signal from the remote station 200 (hereafter called "backward-path optical intensity modulation signal"), by the difference of the traveling direction, and channels these signals to different directions.

Specifically, the directional coupler 160 passes the forward-path optical intensity modulation signal from the terminal a to a terminal b, so as to supply this signal to the remote station 200 via the optical fiber 300, and also passes the backward-path optical intensity modulation signal received from the remote station 200 from the terminal b to a terminal c, so as to supply this signal to the photoelectric convertor 170.

The photoelectric convertor 170 performs photoelectric conversion on the backward-path optical intensity modulation signal received from the remote station 200, electrically extracts a backward-path microwave phase modulation signal included in the backward-path optical intensity modulation signal, and supplies the extracted backward-path microwave phase modulation signal to the microwave demodulator 180 via the filter 175. In some cases, the photoelectric convertor 170 may also perform photoelectric conversion on backscattering components of the forward-path optical intensity modulation signal, which were reflected in the optical fiber 300 while traveling from the base station 100 to the remote station 200, and passed through the directional coupler 160, and electrically extract a forward-path microwave phase modulation signal included in the forward-path optical intensity modulation signal.

The filter 175 is set to a resonance frequency fo=f2, and is disposed between the photoelectric convertor 170 and the microwave demodulator 180. f2 is a second carrier frequency of the backward-path microwave phase modulation signal generated in the remote station 200. The filter 175 eliminates the forward-path microwave phase modulation signal having the first carrier frequency f1 included in the backscattering components of the forward-path optical intensity modulation signal, which were reflected in the optical fiber 300 while traveling from the base station 100 to the remote station 200, and passes the backward-path microwave phase modulation signal having the second carrier frequency f2 extracted from the backward-path optical intensity modulation signal. The filter 175 supplies the passed backward-path microwave phase modulation signal to the microwave demodulator 180.

The microwave demodulator 180 demodulates the backward-path microwave phase modulation signal which reached the base station 100 from the remote station 200 via the optical fiber 300, extracts a timing signal, which traveled from the base station 100 to the remote station 200 via the optical fiber 300, and traveled back to the base station 100 via the optical fiber 300 (hereafter called "round trip timing signal"), and supplies the extracted round trip timing signal to the timing comparison unit 190.

The timing comparison unit 190 compares the timing signal generated by the timing signal generation unit 110 and the round trip timing signal extracted by the microwave demodulator 180, and determines the timing difference Δt equivalent to the round trip delay. The timing comparison unit 190 further calculates ½ of Δt as the transmission delay, and supplies the transmission delay to the control unit 101.

In the remote station 200, the forward-path optical intensity modulation signal supplied from the base station 100 via the optical fiber 300 enters a terminal b of the directional coupler 260.

The directional coupler 260 separates the forward-path optical intensity modulation signal from the base station 100 from a backward-path optical intensity modulation signal traveling from the remote station 200 to the base station 100 by the difference of the traveling direction, and channels these signals to different directions.

Specifically, the directional coupler 260 passes the forward-path optical intensity modulation signal from the base station 100 from the terminal b to a terminal c, so as to supply this signal to the photoelectric convertor 270, and also passes the backward-path optical intensity modulation signal generated in the remote station 200 from a terminal a to the terminal b, so as to supply this signal to the base station 100.

The photoelectric convertor 270 performs photoelectric conversion on the forward-path optical intensity modulation signal, electrically extracts a forward-path microwave phase modulation signal included in the forward-path optical intensity modulation signal, and supplies the extracted forward-path microwave phase modulation signal to the filter 275. In some cases, the photoelectric convertor 270 may also perform photoelectric conversion on the backscattering components of the backward-path optical intensity modulation signal, which were reflected in the optical fiber 300 while traveling, and passed through the directional coupler 260, and electrically extract the backward-path microwave phase modulation signal included in the backward-path optical intensity modulation signal.

The filter 275 is set to a resonance frequency fo=f1, and is disposed between the photoelectric convertor 270 and the microwave demodulator 280. f1 is a first carrier frequency of the forward-path microwave phase modulation signal generated in the base station 100.

The filter 275 eliminates the backward-path microwave phase modulation signal having the second carrier frequency f2, which is included in the backscattering components of the backward-path optical intensity modulation signal, which were reflected in the optical fiber 300 while traveling from the remote station 200 to the base station 100, and passes the forward-path microwave phase modulation signal having the first carrier frequency f1 extracted from the forward-path optical intensity modulation signal. The filter 275 supplies the passed forward-path microwave phase modulation signal to the frequency convertor 235.

The local oscillator 225 generates a local oscillation signal having frequency Δf, and supplies this signal to the frequency convertor 235. The frequency Δf is a frequency of the local oscillation signal that is required to convert the first carrier frequency f1 to the second carrier frequency f2.

The frequency convertor 235 performs frequency conversion using the local oscillation signal having the frequency Δf, and generates the backward-path microwave phase modulation signal having the second carrier frequency f2 from the forward-path microwave phase modulation signal having the first carrier frequency f1. The frequency convertor 235 supplies the generated backward-path microwave phase modulation signal to the filter 295. Here the local oscillator 225 and the frequency convertor 235 constitute the backward-path microwave phase modulation signal generation unit.

The filter 295 is set to a resonance frequency fo=f2, and eliminates the components of frequencies other than the second carrier frequency f2, and passes the backward-path microwave phase modulation signal having the second carrier frequency f2. The filter 295 supplies the backward-path microwave phase modulation signal to the optical intensity modulator 250.

The second laser light source 240 generates a second laser optical signal having the wavelength λ1 which is the same as the first laser optical signal, and supplies the generated second laser optical signal to the optical intensity modulator 250. In Embodiment 1, the phase of a laser optical signal is not used to measure the transmission delay, hence wavelength stability of the laser optical signal is not critical.

The optical intensity modulator 250 generates the backward path optical intensity modulation signal by optical intensity-modulating the second laser optical signal using the backward-path microwave phase modulation signal having the second carrier frequency f2. The optical intensity modulator 250 inputs the generated backward-path optical intensity modulation signal to the terminal a of the directional coupler 260.

The directional coupler 260 separates the backward-path optical intensity modulation signal from the forward-path optical intensity modulation signal by the difference of the traveling direction, passes the backward-path optical intensity modulation signal from the terminal a to the terminal b in FIG. 1, and supplies this signal to the base station 100 via the optical fiber 300.

Figure 2:
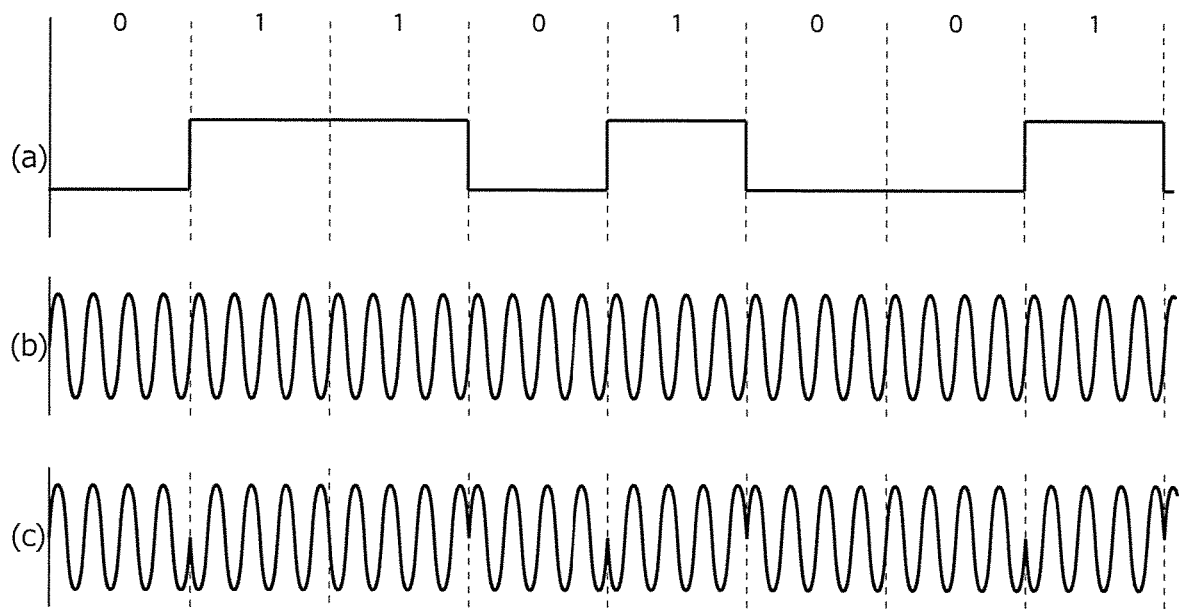
FIG. 2 is a timing chart indicating a state of generating a microwave phase modulation signal according to Embodiment 1.

Generation of the forward-path microwave phase modulation signal by the microwave modulator 130 will now be described with reference to FIG. 2. FIG. 2 is a timing chart indicating the state of generating the forward-path microwave phase modulation signal according to Embodiment 1.

Waveform (a) in FIG. 2 indicates a waveform of a timing signal (e.g. one second signal) generated by the timing signal generation unit 110. Waveform (b) in FIG. 2 indicates a waveform of a first reference microwave signal generated by the microwave generator 120. Waveform (c) in FIG. 2 indicates a waveform of a forward-path microwave phase modulation signal, which is generated by the microwave modulator 130 phase-modulating the first reference microwave signal using the timing signal.

The forward-path microwave phase modulation signal indicated in waveform (c) in FIG. 2 is in a state where the phase of the first reference microwave signal changes at the waveform change timing of the timing signal indicated in waveform (a) in FIG. 2, using the first reference microwave signal indicated in waveform (b) in FIG. 2 as a carrier, and the amplitude of the forward-path microwave phase modulation signal indicated in waveform (c) in FIG. 2 is not changed.

Figure 3:
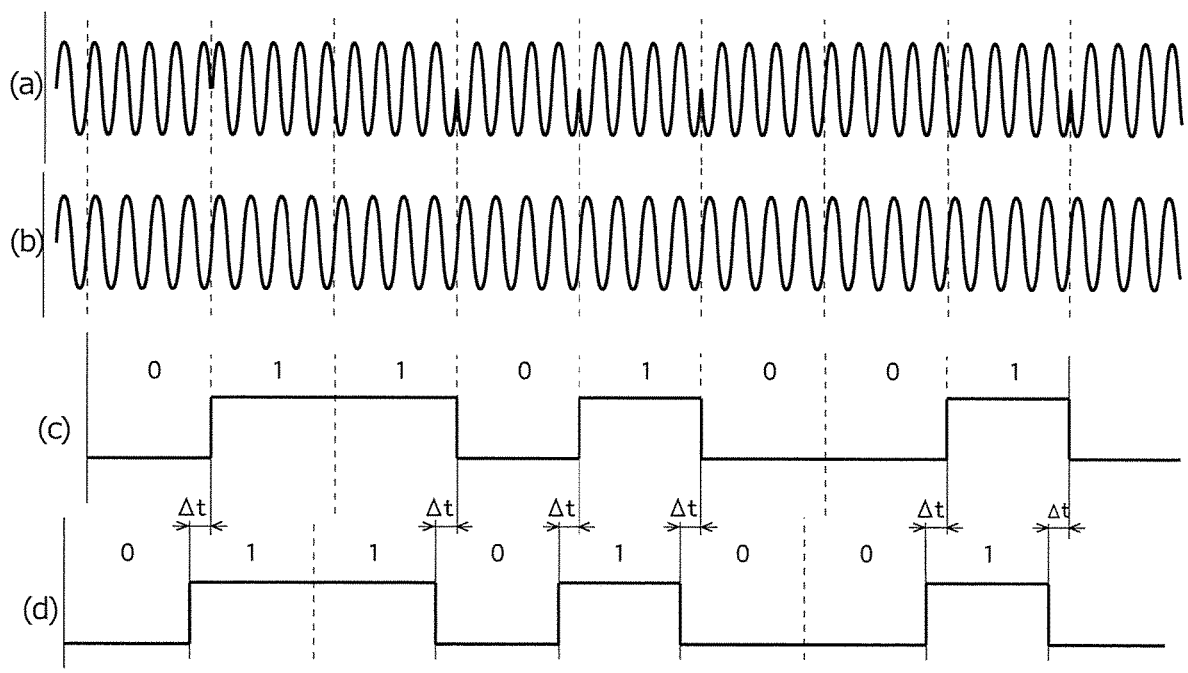
FIG. 3 is a timing chart indicating a state of calculating the transmission delay according to Embodiment 1.

Now a state of extracting the round trip timing signal by synchronous detection and calculating the transmission delay thereby will be described with reference to FIG. 3. FIG. 3 is a timing chart indicating the state of calculating the transmission delay according to Embodiment 1.

Waveform (a) in FIG. 3 indicates a waveform of a backward-path microwave phase modulation signal generated by the photoelectric convertor 170 performing photoelectric conversion on the backward-path optical intensity modulation signal. Waveform (b) in FIG. 3 indicates a waveform of the first reference microwave signal. Waveform (c) in FIG. 3 indicates a waveform of the round trip timing signal which is extracted by performing synchronous detection on the backward-path microwave phase modulation signal (waveform (a) in FIG. 3), using the first reference microwave signal (waveform (b) in FIG. 3) as a reference carrier. Waveform (d) in FIG. 3 indicates a waveform of the timing signal from the timing signal generation unit 110.

The forward-path microwave phase modulation signal from the base station 100 to the remote station 200 is returned from the remote station 200 to the base station 100 as the backward-path microwave phase modulation signal, therefore the timing reference Δt between waveform (c) in FIG. 3 and waveform (d) in FIG. 3 is equivalent to the round trip delay generated by making a round trip via the optical fiber 300.

Hence the timing comparison unit 190 compares the timing signal that the microwave modulator 130 used for the optical intensity modulation, with the round trip timing signal that the microwave demodulator 180 extracted, and determines the timing difference Δt, which is equivalent to the round trip delay. Moreover, the timing comparison unit 190 calculates Δt/2 (half of Δt) as the transmission delay, which is generated from the base station 100 to the remote station 200 via the optical fiber 300, and notifies the control unit 101 of the calculated Δt/2.

Processing Procedure in Each Component of System 1A

Figure 4:
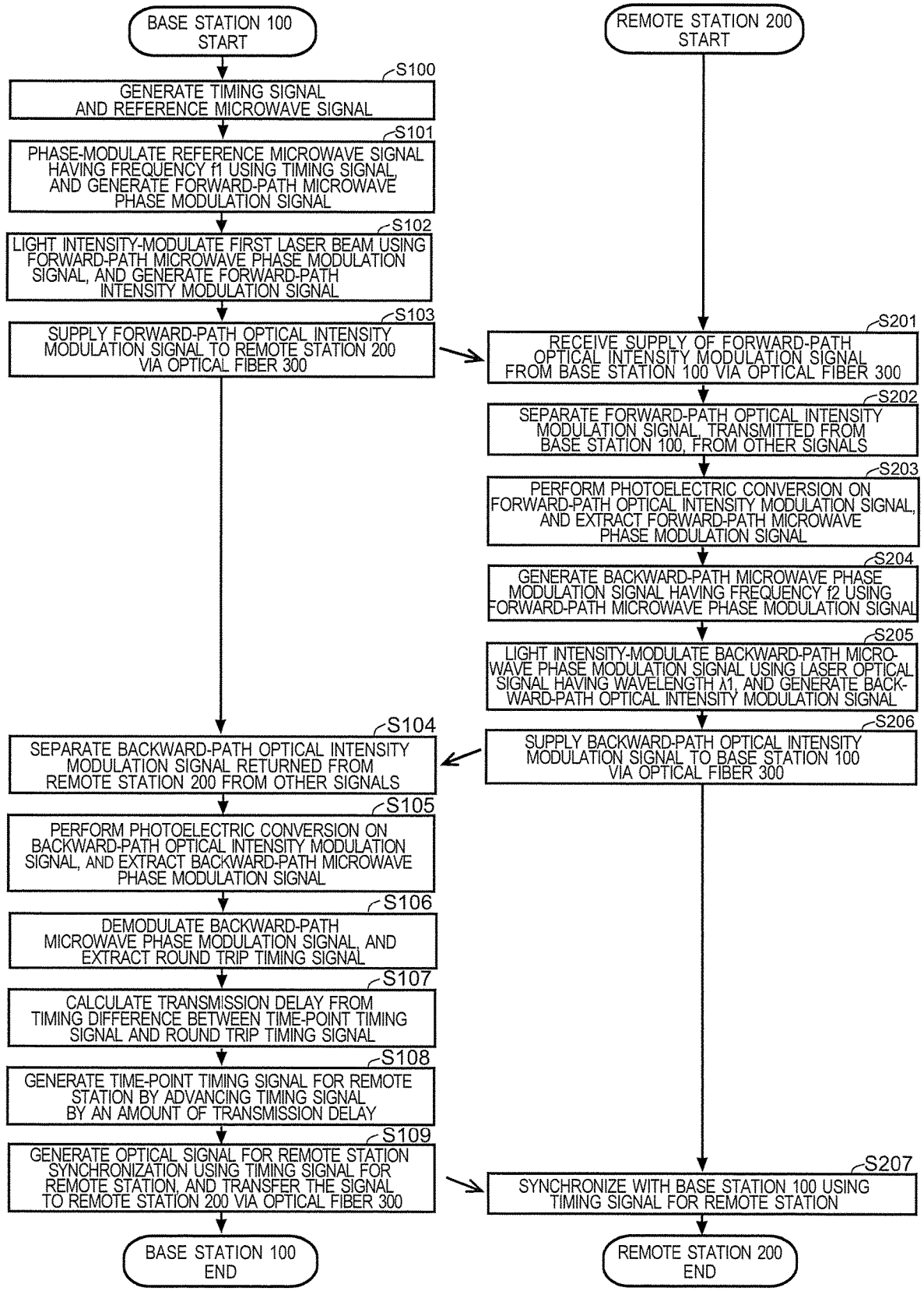
FIG. 4 is a flow chart indicating a processing procedure in each component of the system according to Embodiment 1.

A processing procedure in each component of the system 1A, that is, a procedure of the method for generating the timing signal, will now be described with reference to the flow chart in FIG. 4. FIG. 4 is a flow chart indicating the processing procedure in each component of the system 1A according to Embodiment 1.

In this flow chart, the base station 100 performs the processing steps S100 to S109, and the remote station 200 performs the processing steps S201 to S207.

The flow chart in FIG. 4 indicates a causal relationship or correlation of various signals when the signals are generated or processed, and does not accurately indicate the timing or sequence of the processing steps. Further, it is possible to execute some of the processing steps simultaneously, or at overlapped timings, or in reversed sequence.

First in step S100, the timing signal generation unit 110 generates a timing signal, and supplies the generated timing signal to the microwave modulator 130 and the timing comparison unit 190. The microwave generator 120 generates the first reference microwave signal having the first carrier frequency f1, and supplies the generated first reference microwave signal to the microwave modulator 130. The first laser light source 140 generates the first laser optical signal having the wavelength λ1, and supplies the generated first laser optical signal to the optical intensity modulator 150. Then processing advances to step S101.

In step S101, the microwave modulator 130 generates the forward-path microwave phase modulation signal by phase-modulating the first reference microwave signal having the first carrier frequency f1 using the timing signal, and supplies the generated forward-path microwave phase modulation signal to the optical intensity modulator 150. Then processing advances to step S102.

In step S102, the optical intensity modulator 150 generates the forward-path optical intensity modulation signal by optical intensity-modulating the first laser optical signal using the forward-path microwave phase modulation signal. The optical intensity modulator 150 inputs the generated forward-path optical intensity modulation signal to the terminal a of the directional coupler 160. Then processing advances to step S103.

In step S103, the directional coupler 160 passes the forward-path optical intensity modulation signal inputted to the terminal a toward the terminal b, and supplies the forward-path optical intensity modulation signal to the remote station 200 via the optical fiber 300. Then processing advances to step S201 that is performed in the remote station 200.

In step S201, the remote station 200 receives the forward-path optical intensity modulation signal, which is supplied from the base station 100 via the optical fiber 300. Then processing advances to step S202.

In step S202, the directional coupler 260 separates the forward-path optical intensity modulation signal, received from the base station 100, from other signals by the difference of the traveling directions of the signals, and supplies the forward-path optical intensity modulation signal to the photoelectric convertor 270. The other signals that pass through the directional coupler 260 include a later mentioned backward-path optical intensity modulation signal. Then processing advances to step S203.

In step S203, the photoelectric convertor 270 performs photoelectric conversion on the forward-path optical intensity modulation signal, extracts the forward-path microwave phase modulation signal, and supplies the extracted forward-path microwave phase modulation signal to the filter 275. In some cases, the photoelectric convertor 270 may also perform photoelectric conversion on the backscattering components of a backward-path optical intensity modulation signal, which is reflected in the optical fiber 300 while traveling, and may electrically extract a backward-path microwave phase modulation signal included in the backward-path optical intensity modulation signal thereby.

Hence the filter 275, which is set to the resonance frequency fo=f1, eliminates the backward-path microwave phase modulation signal having the second carrier frequency f2 included in the backscattering components of the backward-path optical intensity modulation signal, and passes the forward-path microwave phase modulation signal having the first carrier frequency f1 extracted from the forward-path optical intensity modulation signal. Then processing advances to step S204.

In step S204, the frequency convertor 235 performs frequency conversion on the forward-path microwave phase modulation signal having the first carrier frequency f1 using the local oscillation signal having the frequency Δf, and generates the backward-path microwave phase modulation signal having the second carrier frequency f2. The frequency convertor 235 supplies the generated backward-path microwave phase modulation signal to the filter 295.

The local oscillator 225 need not synchronize phases as long as the frequency Δf of the local oscillation signal is maintained.

The filter 295 is set to the resonance frequency fo=f2 and eliminates the components of frequencies other than the frequency f2, and at the same time, passes the backward-path microwave phase modulation signal having the second carrier frequency f2, and supplies this backward-path microwave phase modulation signal to the optical intensity modulator 250. Then processing advances to step S205.

In step S205, the optical intensity modulator 250 generates the backward-path optical intensity modulation signal by optical intensity-modulating the second laser optical signal having the wavelength λ1 using the backward-path microwave phase modulation signal. The optical intensity modulator 250 inputs the generated backward-path optical intensity modulation signal to the terminal a of the directional coupler 260. Then processing advances to step S206.

In step S206, the directional coupler 260 passes the backward-path optical intensity modulation signal inputted to the terminal a toward the terminal b, and supplies the backward-path optical intensity modulation signal to the base station 100 via the optical fiber 300. Then processing advances to step S104 that is performed in the base station 100.

In step S104, the directional coupler 160 separates each signal by the difference of the traveling directions of the signals, passes the backward-path optical intensity modulation signal received from the remote station 200 from the terminal b toward the terminal c, and supplies the backward-path optical intensity modulation signal to the photoelectric convertor 170. Then processing advances to step S105.

In step S105, the photoelectric convertor 170 performs photoelectric conversion on the backward-path optical intensity modulation signal, and electrically extracts the backward-path microwave phase modulation signal included in the backward-path optical intensity modulation signal. In some cases, the photoelectric convertor 170 may also perform photoelectric conversion on backscattering components of the forward-path optical intensity modulation signal, which were reflected in the optical fiber 300 while traveling from the base station 100 to the remote station 200, and passed through the directional coupler 160, and electrically extract the forward-path microwave phase modulation signal included in the forward-path optical intensity modulation signal.

Hence the filter 175, which is set to the resonance frequency fo=f2, eliminates the forward-path microwave phase modulation signal having the first carrier frequency f1 included in the backscattering components of the forward-path optical intensity modulation signal, and passes the backward-path microwave phase modulation signal having the second carrier frequency f2 extracted from the backward-path intensity modulation signal. The filter 175 supplies the backward-path microwave phase modulation signal to the microwave demodulator 180. Then processing advances to step S106.

In step S106, the microwave demodulator 180 demodulates the backward-path microwave phase modulation signal, extracts the round trip timing signal which traveled from the base station 100 to the remote station 200 via the optical fiber 300 and traveled back from the optical fiber 300 to the base station 100, and supplies the round trip timing signal to the timing comparison unit 190. Then processing advances to step S107.

In step S107, the timing comparison unit 190 compares the timing signal received from the timing signal generation unit 110 and the round trip timing signal extracted by the microwave demodulator 180, and determines the timing difference Δt, which is equivalent to the round trip delay. The timing comparison unit 190 further calculates ½ of Δt as the transmission delay. As a result, the transmission delay which is generated on the optical signal transmitted between the base station 100 and the remote station 200 via the optical fiber 300 can be accurately measured. Thereafter processing advances to step S108.

In step S108, the control unit 101 controls the timing signal generation unit 110 so as to generate a timing signal of which timing has been advanced by the amount of the transmission delay (hereafter called "timing signal for the remote station").

Specifically, in the case of generating the timing signal of which timing has been advanced by the amount of the transmission delay, the timing signal generation unit 110 provides a delay equivalent to ((time of one pulse of the timing signal)−(transmission delay)) to the timing signal. Actually 1 PPS signal from an external atomic clock (not illustrated) or a reference signal is inputted to the timing signal generation unit 110, and the timing signal generation unit 110 generates the timing signal of which transmission delay has been corrected. In this case, the timing signal generation unit 110 functions as a delay circuit, where the delay amount is controlled by the control unit 101. Then processing advances to step S109.

In step S109, the control unit 101 controls such that the optical signal for synchronizing the remote station is supplied to the remote station 200 via the optical fiber 300. For this optical signal for synchronizing the remote station, modulation other than the microwave phase modulation and the optical intensity modulation may be used. Then processing advances to step S207 which is performed in the remote station 200.

In step S207, the remote station 200 extracts the timing signal for the remote station from the optical signal for synchronizing the remote station received via the optical fiber 300, and controls the timing in each component of the remote station 200 using the timing signal for the remote station.

By the series of processing steps described above, the transmission delay generated on the optical signal, which is transferred between the base station 100 and the remote station 200 via the optical fiber 300, is accurately measured, and thereby the timing can be precisely synchronized between the base station 100 and the remote station 200.

Features of System 1A

In the system 1A of Embodiment 1, the base station 100 generates the forward-path optical intensity modulation signal by optical intensity-modulating the first laser optical signal having the wavelength λ1 using the forward-path microwave phase modulation signal having the first carrier frequency f1, and supplies this forward-path optical intensity modulation signal to the remote station 200.

The remote station 200, on the other hand, generates the backward-path microwave phase modulation signal by shifting the first carrier frequency f1 of the forward-path microwave phase modulation signal to the second carrier frequency f2, generates the backward-path optical intensity modulation signal by optical intensity-modulating the second laser optical signal having the wavelength λ1 using the backward-path microwave phase modulation signal, and supplies this backward-path optical intensity modulation signal to the base station 100.

Because of the forward-path microwave phase modulation signal and the backward-path microwave phase modulation signal, which are set to different carrier frequencies f1 and f2, the base station 100 can separate the backward-path microwave phase modulation signal from the forward-path microwave phase modulation signal and the backscattering components thereof. In the same manner, the remote station 200 can separate the forward-path microwave phase modulation signal from the backward-path microwave phase modulation signal and the backscattering components thereof.

Since the forward-path microwave phase modulation signal and the backward-path microwave phase modulation signal can be separated using the difference of the carrier frequencies f1 and f2, laser optical signals having the same wavelength λ1 can be used for the forward-path optical intensity modulation signal and the backward-path optical intensity modulation signal. As a result, the transmission delay can be precisely determined, and the signals can be transmitted at precise timings thereby on the optical fiber 300 without being influenced by chromatic dispersion.

In the system 1A of Embodiment 1, the phase of the laser optical signal is not used as a parameter, hence wavelength stability of the laser optical signals generated by the first laser light source 140 and the second laser light source 240 are not critical. This means that there is no need to use expensive laser light sources that excel in wavelength stability, narrow line width oscillation characteristics, and the like.

In the system 1A of Embodiment 1, the forward-path optical intensity modulation signal and the backward-path optical intensity modulation signal are used as optical signals, hence the forward-path microwave phase modulation signal and the backward-path microwave phase modulation signal can be extracted simply by converting the intensity of the optical signals into electric signals using the photoelectric convertors 170 and 270. Therefore, in the case of the system 1A of Embodiment 1, a complicated circuit configuration, accurate temperature compensation, and the like, that are required for the optical phase modulation, are unnecessary, and high precision processing can be easily implemented.

In the system 1A of Embodiment 1, in the case where only the transmission of the timing signal from the base station 100 to the remote station 200 is required, the local oscillator 225 of the remote station 200 need not phase-synchronize with the carrier of the forward-path microwave phase modulation signal transmitted from the base station 100, as long it oscillates in the self-running state.

On the other hand, in the case where the local oscillation signal of the local oscillator 225 in the remote station 200 is phase-synchronized with the carrier of the forward-path microwave phase modulation signal transmitted from the base station 100, the timing signal and the frequency information can be transmitted from the base station 100 to the remote station 200.

In Embodiment 1, the backward-path microwave phase modulation signal is generated by shifting the first carrier frequency f1 of the forward-path microwave phase modulation signal to the second carrier frequency f2 using the frequency convertor 235, hence the configuration of the system 1A can be simplified.

Embodiment 2

Figure 5:
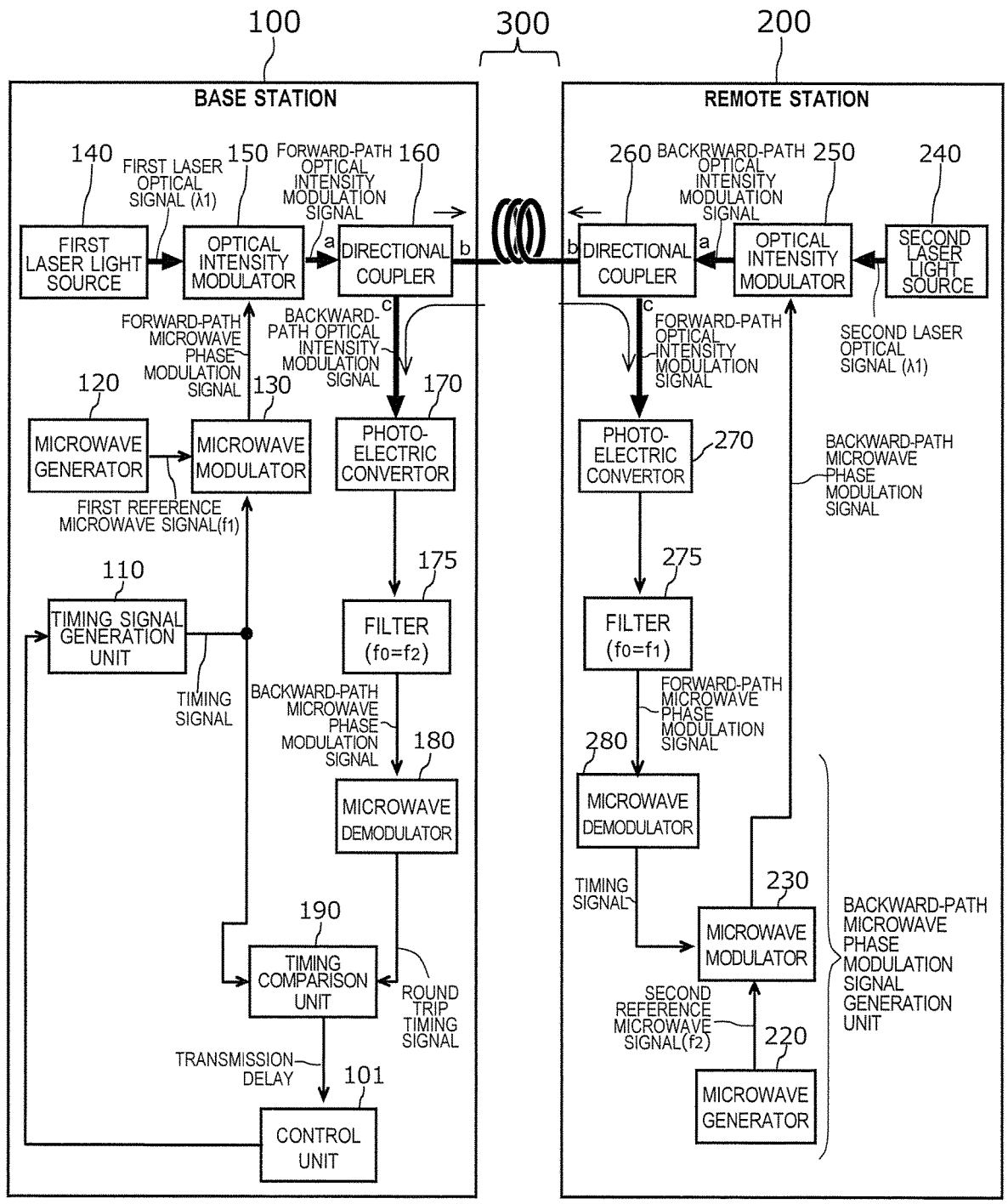
FIG. 5 is a block diagram depicting a configuration of a system according to Embodiment 2.

A configuration of a system 1B according to Embodiment 2 of the present disclosure will be described next with reference to FIG. 5. FIG. 5 is a block diagram depicting the configuration of the system 1B according to Embodiment 2.

In the system 1B depicted in FIG. 5, a same composing element as the system 1A, according to Embodiment 1 depicted in FIG. 1, is denoted with a same reference number.

Here a configuration and processing of the system 1B according to Embodiment 2 will be described primarily focusing on the aspects that are different from the system 1A according to Embodiment 1.

In the system 1B, a microwave generator 220, a microwave modulator 230 and a microwave demodulator 280 are disposed, instead of the local oscillator 225 and the frequency convertor 235 of the system 1A. Here the microwave generator 220, the microwave modulator 230 and the microwave demodulator 280 constitute a backward-path microwave phase modulation signal generation unit.

The microwave demodulator 280 demodulates a forward-path microwave phase modulation signal supplied from the base station 100 to the remote station 200, and extracts a timing signal. The microwave demodulator 280 supplies the extracted timing signal to the microwave modulator 230.

The microwave generator 220 generates a second reference microwave signal having the second carrier frequency f2, and supplies the generated second reference microwave signal to the microwave modulator 230.

The microwave modulator 230 phase-modulates the second reference microwave signal having the second carrier frequency f2 using the timing signal extracted by the microwave demodulator 280, and generates a backward-path microwave phase modulation signal. The microwave modulator 230 supplies the backward-path microwave phase modulation signal to the optical intensity modulator 250.

In the system 1B, in the case where only the transmission of the timing signal from the base station 100 to the remote station 200 is required, the microwave generator 220 of the remote station 200 need not phase-synchronize with the carrier of the forward-path microwave phase modulation signal transmitted from the base station 100, as long as it oscillates in the self-running state.

In the system 1B, the timing signal is extracted from the forward-path microwave phase modulation signal, and the backward-path microwave phase modulation is newly generated from the extracted timing signal and the newly generated second reference microwave signal, hence unnecessary frequency components (spurious components) included in the backward-path microwave phase modulation signal can be reduced to the utmost limit.

Embodiment 3

Figure 6:
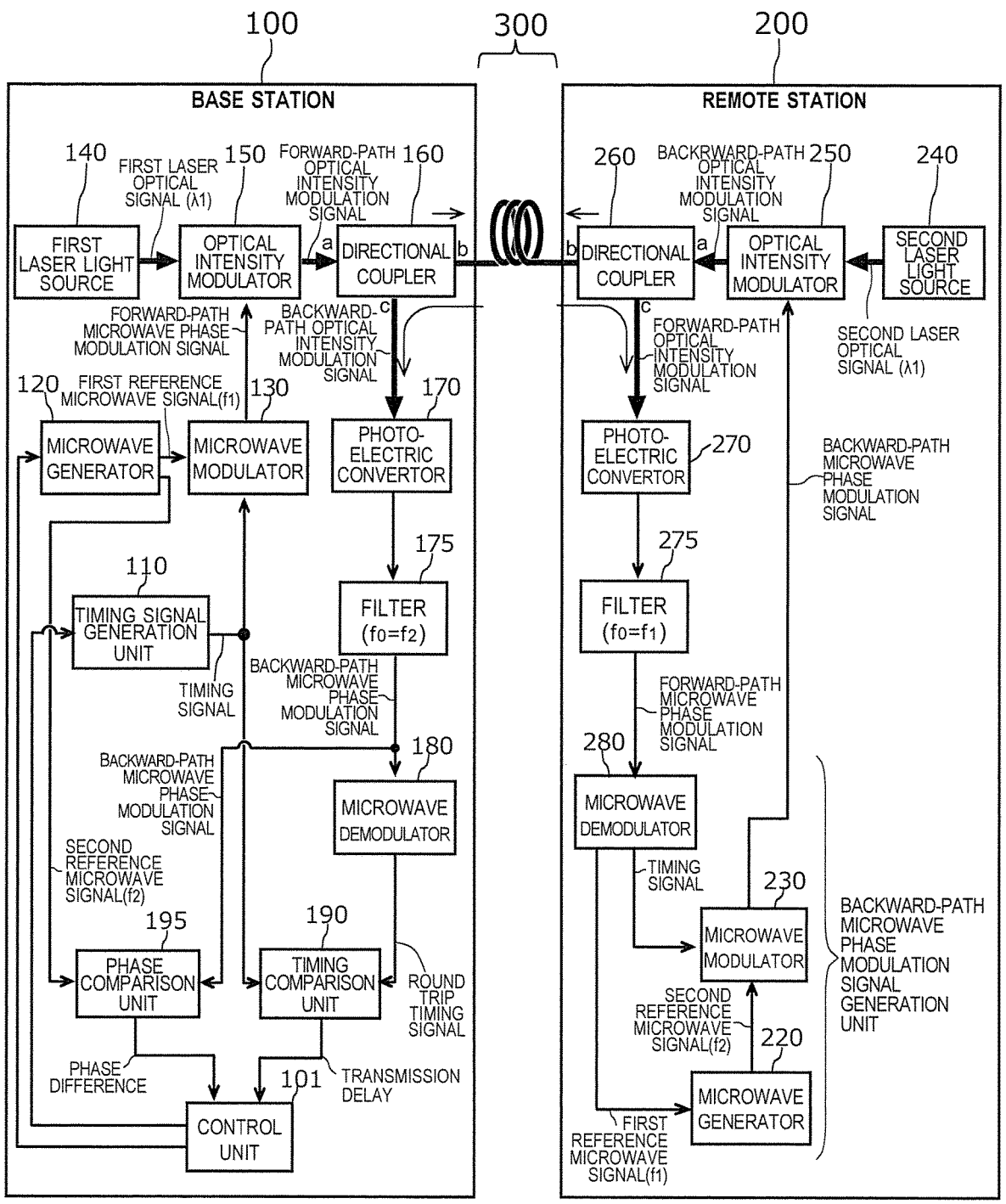
FIG. 6 is a block diagram depicting a configuration of a system according to Embodiment 3.

A configuration of a system 1C according to Embodiment 3 of the present disclosure will be described next with reference to FIG. 6. FIG. 6 is a block diagram depicting the configuration of the system 1C according to Embodiment 3. In the system 1C depicted in FIG. 6, a same composing element as the system 1A according to Embodiment 1 depicted in FIG. 1, or the system 1B according to Embodiment 2 depicted in FIG. 5, is denoted with the same reference number.

The system 1C is a modification of the system 1B of Embodiment 2, so that not only the timing signal but also the frequency information can be transmitted from the base station 100 to the remote station 200. Here a configuration and processing of the system 1C according to Embodiment 3 will be described primarily focusing on the aspects that are different from the system 1A according to Embodiment 1 or the system 1B according to Embodiment 2.

In the system 1C, a phase comparison unit 195 is further disposed in the base station 100. In the remote station 200, the microwave generator 220, the microwave modulator 230 and the microwave demodulator 280 are disposed in the same manner as the system 1B.

The microwave demodulator 280 not only demodulates the forward-path microwave phase modulation signal supplied from the base station 100 to the remote station 200, and extracts the timing signal, but also regenerates the first reference microwave signal, which is a carrier of the forward-path microwave phase modulation signal, and supplies the regenerated signal to the microwave generator 220.

Using the first reference microwave signal regenerated by the microwave demodulator 280 as the phase synchronization signal, the microwave generator 220 generates the second reference microwave signal having the second carrier frequency f2 in the state of phase-synchronizing with the first reference microwave signal.

The microwave modulator 230 phase-modulates the second reference microwave signal using the timing signal extracted by the microwave demodulator 280, and generates the backward-path microwave phase modulation signal. The microwave modulator 230 supplies the backward-path microwave phase modulation signal to the optical intensity modulator 250.

Here the second reference microwave signal received from the microwave generator 220 is in the state of phase-synchronizing with the first reference microwave signal in the remote station 200, hence the backward-path microwave phase modulation signal acquired by the microwave modulator 230 is also in the state of phase-synchronizing with the first reference microwave signal in the remote station 200.

The optical intensity modulator 250 optical intensity-modulates the second laser optical signal using the backward-path microwave phase modulation signal which is in the state of phase-synchronizing with the first reference microwave signal in the remote station 200, and generates the backward-path optical intensity signal thereby. The optical intensity modulator 250 inputs the generated backward-path optical intensity modulation signal to the terminal a of the directional coupler 260.

The directional coupler 260 passes the backward-path optical intensity modulation signal from the terminal a toward the terminal b indicated in FIG. 1, and supplies the signal to the base station 100 via the optical fiber 300.

The microwave generator 120 not only generates the first reference microwave signal having the first carrier frequency f1, but also generates the second reference microwave signal having the second carrier frequency f2. The microwave generator 120 supplies the first reference microwave signal to the microwave modulator 130, and supplies the second reference microwave signal to the phase comparison unit 195. Here the second reference microwave signal is the same as the second reference microwave signal having the second carrier frequency f2, which is generated by the microwave generator 220.

The phase comparison unit 195 compares the phases of the backward-path microwave phase modulation signal having the second carrier frequency f2, which is transmitted from the remote station 200 and is passed the filter 175, and the second reference microwave signal having the second carrier frequency f2 received from the microwave generator 120.

The backward-path microwave phase modulation signal is generated so as to be phase-synchronized with the first reference microwave signal regenerated from the forward-path microwave phase modulation signal in the remote station 200.

Therefore, the phase comparison unit 195 can detect the phase change amount (round trip phase change amount) $\Delta\theta$ generated by traveling from the base station 100 to the remote station 200 via the optical fiber 300, and traveling back to the base station 100 via the optical fiber 300.

The phase comparison unit 195 also calculates ½ of $\Delta\theta$ as the transmission phase change amount that is generated from the base station 100 to the remote station 200 via the optical fiber 300, and supplies this transmission phase change amount to the control unit 101.

As a timing synchronization control, the control unit 101 controls each component of the base station 100 so as to: generate the timing signal for which the time-point has been advanced by the amount of the transmission delay using the timing signal generation unit 110; generate the first reference microwave signal of which phase has been advanced by the transmission phase change amount using the microwave generator 120; generate the optical signal for synchronizing the remote station by modulating the laser optical signal using the microwave phase modulation signal which the microwave modulator 130 generated using the timing signal, which has been advanced by the amount of the transmission delay and the first reference microwave signal of which phase has been advanced by the transmission phase change amount; and supply the optical signal for synchronizing the remote station to the remote station 200 via the optical fiber 300.

Specifically, in the case of generating the timing signal of which time has been advanced by the amount of the transmission delay, the timing signal generation unit 110 provides a delay equivalent to ((time of one pulse of the timing signal)−(transmission delay)) to the timing signal based on the control by the control unit 101. Further, in the case of generating the first reference microwave signal of which phase has been advanced by the transmission phase change amount, the microwave generator 120 generates the first reference microwave sign of which phase is (360°−transmission phase change amount), or (−transmission phase change amount) based on the control by the control unit 101.

By the series of processing steps described above, the transmission delay and the transmission phase change amount generated on the optical signal, which is transmitted between the base station 100 and the remote station 200 via the optical fiber 300, can be precisely measured, thereby not only the timing signal but also the frequency information can be transmitted from the base station 100 to the remote station 200.

Effects Acquired from Embodiments

The following are the effects from the method and the system for generating the timing signal that is transmitted from the base station 100 to the remote station 200 via the optical fiber 300 according to the embodiments.

In the present disclosure, in the base station 100: the forward-path phase modulation signal is generated by phase-modulating the first reference microwave signal having the first carrier frequency f1 using the timing signal; the forward-path optical intensity modulation signal is generated by optical intensity-modulating the first laser optical signal having the wavelength $\lambda 1$ using the forward-path microwave phase modulation signal; and the forward-path optical intensity modulation signal is transmitted from the base station 100 to the remote station 200 via the optical fiber 300. In the remote station 200: the photoelectric conversion is performed on the forward-path optical intensity modulation signal transmitted from the base station 100 and the forward-path microwave phase modulation signal is extracted; the backward-path microwave phase modulation signal having the second carrier frequency f2, which is different from the first carrier frequency f1, is generated using the forward-path microwave phase modulation signal; the backward-path optical intensity modulation signal is generated by performing the optical intensity modulation on the second laser optical signal having the wavelength $\lambda 1$ using the backward-path microwave phase modulation signal; and the backward-path optical intensity modulation signal is transmitted from the remote station 200 to the base station 100 via the optical fiber 300. Then in the base station 100: the photoelectric conversion is performed on the backward-path optical intensity modulation signal, and the backward-path microwave phase modulation signal is electrically extracted; the backward-path microwave phase modulation signal is demodulated and the round trip timing signal is extracted; and the transmission delay is determined from the timing difference between the timing signal and the round trip timing signal; and the timing signal for the remote station 200 is generated by advancing the timing signal by the amount of the transmission delay.

Thereby the optical signal for synchronizing the remote station, which includes the high precision timing signal generated using the above-mentioned method, can be transmitted from the base station 100 to the remote station 200, hence the timings between distant stations can be precisely synchronized.

According to the present disclosure, in the remote station 200, the backward-path microwave phase modulation signal is generated so as to be phase-synchronized with the first reference microwave signal which is regenerated from the forward-path microwave phase modulation signal, whereby the phase comparison unit 195 of the base station 100 can detect the phase change amount (round trip phase change amount) $\Delta\theta$ generated by traveling from the base station 100 to the remote station 200 via the optical fiber 300, and traveling back to the base station 100 via the optical fiber 300. By precisely measuring the transmission delay and the transmission phase change amount generated on the optical signal transmitted between the base station 100 and the remote station 200 via the optical fiber 300 like this, not only the timing signal, but also the frequency information can be transmitted from the base station 100 to the remote station 200.

By the present disclosure, timings can be precisely synchronized between a plurality of distant stations. Therefore, the present disclosure can be applied to super high-speed optical communication, deep space exploration, space/astronomical precision measurement, and various other precision measurement fields.

What is claimed is:

1. A method for generating a timing signal that is transmitted from a base station to a remote station via an optical fiber, the method comprising:
    a step of, in the base station,
    generating a forward-path microwave phase modulation signal by phase-modulating a first reference microwave signal having a first carrier frequency by using the timing signal,
    generating a forward-path optical intensity modulation signal by optical intensity-modulating a first laser optical signal having a wavelength $\lambda 1$ by using the forward-path microwave phase modulation signal, and
    transmitting the forward-path optical intensity modulation signal from the base station to the remote station via the optical fiber;
    a step of, in the remote station,
    performing photoelectric conversion on the forward-path optical intensity modulation signal transmitted from the base station and electrically extracting a forward-path microwave phase modulation signal,
    generating a backward-path microwave phase modulation signal having a second carrier frequency, which is different from the first carrier frequency, by using the forward-path microwave phase modulation signal,
    generating a backward-path optical intensity modulation signal by performing optical intensity modulation on a second laser optical signal having the wavelength $\lambda 1$ by using the backward-path microwave phase modulation signal, and
    transmitting the backward-path optical intensity modulation signal from the remote station to the base station via the optical fiber; and
    a step, in the base station,
    performing photoelectric conversion on the backward-path optical intensity modulation signal and electrically extracting a backward-path microwave phase modulation signal,
    demodulating the backward-path microwave phase modulation signal and extracting a round trip timing signal,
    determining a transmission delay from a timing difference between the timing signal and the round trip timing signal, and
    generating the timing signal for the remote station by advancing the timing signal by an amount of the transmission delay.

2. The method for generating a timing signal according to claim 1, further comprising:
    a step of, in the remote station,
    extracting the timing signal from the forward-path microwave phase modulation signal, and regenerating the first reference microwave signal having the first carrier frequency,
    generating a second reference microwave signal having the second carrier frequency so as to phase-synchronize with the first reference microwave signal, and
    generating the backward-path microwave phase modulation signal by phase-modulating the second reference microwave signal by using the timing signal; and
    a step of, in the base station,
    generating the second reference microwave signal having the second carrier frequency,
    comparing the phase of the backward-path microwave phase modulation signal, which is extracted by performing photoelectric conversion on the backward-path optical intensity modulation signal, with the second reference microwave signal,
    determining a transmission phase change amount from a round trip phase change amount acquired by the comparison, and
    generating the timing signal by advancing the timing signal by the amount of the transmission delay and the transmission phase change amount.

3. A system for generating a timing signal that is transmitted from a base station to a remote station via an optical fiber,
    the base station including:
    a timing signal generation unit configured to generate the timing signal and supply the generated timing signal to a microwave modulator and a timing comparison unit;
    a microwave generator configured to generate a first reference microwave signal having a first carrier frequency and supply the generated first reference microwave signal to a microwave modulator;
    a microwave modulator configured to generate a forward-path microwave phase modulation signal by phase-modulating the first reference microwave signal by using the timing signal, and supply the generated forward-path microwave phase modulation signal to an optical intensity modulator;
    a first laser light source configured to generate a first laser optical signal having a wavelength $\lambda 1$ and supply the generated first laser optical signal to the optical intensity modulator;
    an optical intensity modulator configured to generate a forward-path optical intensity modulation signal by optical intensity-modulating the first laser optical signal by using the forward-path microwave phase modulation signal, and supply the generated forward-path optical intensity modulation signal to a directional coupler;
    a directional coupler configured to supply the forward-path optical intensity modulation signal to the remote station via the optical fiber, separate a backward-path optical intensity modulation signal, which is supplied from the remote station via the optical fiber, from the forward-path optical intensity modulation signal, and supply the separated backward-path optical intensity modulation signal to a photoelectric convertor;

a photoelectric convertor configured to perform photoelectric conversion on the backward-path optical intensity modulation signal and extract a backward-path microwave phase modulation signal, and supply the extracted backward-path microwave phase modulation signal to a microwave demodulator;

a microwave demodulator configured to extract a round trip timing signal from the backward-path microwave phase modulation signal, and supply the extracted round trip timing signal to a timing comparison unit;

a timing comparison unit configured to determine a transmission delay from a timing difference between the timing signal and the round trip timing signal and notify a control unit of the determined transmission delay; and the control unit configured to perform control, based on the transmission delay, and the remote station including:

a directional coupler configured to separate the forward-path optical intensity modulation signal, which is supplied from the base station via the optical fiber, from the backward-path optical intensity modulation signal, and supply the separated forward-path optical intensity modulation signal to a photoelectric convertor, and supply the backward-path optical intensity modulation signal to the remote station via the optical fiber;

a photoelectric convertor configured to perform photoelectric conversion on the forward-path optical intensity modulation signal and extract the forward-path microwave phase modulation signal, and supply the extracted forward-path microwave phase modulation signal to a backward-path microwave phase modulation signal generation unit;

a backward-path microwave phase modulation signal generation unit configured to generate a backward-path microwave phase modulation signal having a second carrier frequency, which is different from the first carrier frequency, by using the forward-path microwave phase modulation signal, and supply the generated backward-path microwave phase modulation signal to an optical intensity modulator;

a second laser light source configured to generate a second laser optical signal having the wavelength λ1 and supply the generated second laser optical signal to the optical intensity modulator; and an optical intensity modulator configured to generate the backward-path optical intensity modulation signal by optical intensity-modulating the second laser optical signal by using the backward-path microwave phase modulation signal, and supply the generated backward-path optical intensity modulation signal to the directional coupler, wherein the control unit controls the timing signal generation unit, and generates the timing signal for the remote station by advancing the timing signal by an amount of the transmission delay.

4. The system for generating a timing signal according to claim 3, wherein the backward-path microwave phase modulation signal generation unit includes a local oscillator and a frequency convertor, the local oscillator generates a local oscillation signal and supplies the generated local oscillation signal to the frequency convertor, and the frequency convertor performs frequency conversion by using the local oscillation signal, and generates, from the forward-path microwave phase modulation signal having the first carrier frequency, the backward-path microwave phase modulation signal having the second carrier frequency, which is different from the first carrier frequency.

5. The system for generating a timing signal according to claim 4, wherein the base station includes a filter, of which resonance frequency is set to a second carrier frequency, between the photoelectric convertor and the microwave demodulator, the filter passes the backward-path microwave phase modulation signal having the second carrier frequency extracted from the backward-path optical intensity modulation signal, the remote station includes a filter, of which resonance frequency is set to a first carrier frequency, between the photoelectric convertor and the microwave demodulator, and the filter passes a forward-path microwave phase modulation signal having the first carrier frequency extracted from the forward-path optical intensity modulation signal.

6. The system for generating a timing signal according to claim 3, wherein the backward-path microwave phase modulation signal generator includes a microwave demodulator, a microwave generation unit and a microwave modulator, the microwave demodulator extracts the timing signal from the forward-path microwave phase modulation signal, and supplies the extracted timing signal to the microwave modulator, the microwave generator generates a second reference microwave signal having the second carrier frequency, which is different from the first carrier frequency, and supplies the generated second reference microwave signal to the microwave modulator, and the microwave modulator phase-modulates the second reference microwave signal by using the timing signal, generates a backward-path microwave phase modulation signal having the second carrier frequency, which is different from the first carrier frequency, and supplies the generated backward-path microwave phase modulation signal to the optical intensity modulator.

7. The system for generating a timing signal according to claim 6, wherein in the remote station, the microwave demodulator extracts the timing signal from the forward-path microwave phase modulation signal, supplies the extracted timing signal to the microwave modulator, regenerates the first reference microwave signal from the forward-path microwave phase modulation signal, and supplies the regenerated first reference microwave signal to the microwave generator, the microwave generator generates a second reference microwave signal having the second carrier frequency in a state of a phase-synchronizing with the first reference microwave signal by using the first reference microwave signal as a phase-synchronizing signal, and supplies the generated second reference microwave signal to the microwave modulator, and the microwave modulator generates the backward-path microwave phase modulation signal by phase-modulating the second reference microwave signal, which is phase-synchronized with the first reference microwave signal, using the timing signal; and in the base station, a phase comparison unit is further provided, the microwave generator further generates the second reference microwave signal and supplies the generated second reference microwave signal to the phase comparison unit, the photoelectric convertor further supplies the backward-path microwave phase modulation signal, which is extracted from the backward-path optical intensity modulation signal by photoelectric conversion, to the phase comparison unit, the phase comparison unit calculates a transmission phase change amount from the phase change amount between the second reference microwave signal and the backward-path microwave phase modulation signal, and supplies the calculated transmission phase change amount to the control unit, and the control unit controls a timing signal generation unit to advance the timing signal by an amount of transmission delay, controls a microwave generator to advance the first reference microwave signal by the transmission phase change amount, and generates the timing signal for the remote station.

8. The system for generating a timing signal according to claim 7, wherein the base station includes a filter, of which resonance frequency is set to a second carrier frequency, between the photoelectric convertor and the microwave demodulator, the filter passes the backward-path microwave phase modulation signal having the second carrier frequency extracted from the backward-path optical intensity modulation signal, the remote station includes a filter, of which resonance frequency is set to a first carrier frequency, between the photoelectric convertor and the microwave demodulator, and the filter passes a forward-path microwave phase modulation signal having the first carrier frequency extracted from the forward-path optical intensity modulation signal.

9. The system for generating a timing signal according to claim 6, wherein the base station includes a filter, of which resonance frequency is set to a second carrier frequency, between the photoelectric convertor and the microwave demodulator, the filter passes the backward-path microwave phase modulation signal having the second carrier frequency extracted from the backward-path optical intensity modulation signal, the remote station includes a filter, of which resonance frequency is set to a first carrier frequency, between the photoelectric convertor and the microwave demodulator, and the filter passes a forward-path microwave phase modulation signal having the first carrier frequency extracted from the forward-path optical intensity modulation signal.

10. The system for generating a timing signal according to claim 3, wherein the base station includes a filter, of which resonance frequency is set to a second carrier frequency, between the photoelectric convertor and the microwave demodulator, the filter passes the backward-path microwave phase modulation signal having the second carrier frequency extracted from the backward-path optical intensity modulation signal, the remote station includes a filter, of which resonance frequency is set to a first carrier frequency, between the photoelectric convertor and the microwave demodulator, and the filter passes a forward-path microwave phase modulation signal having the first carrier frequency extracted from the forward-path optical intensity modulation signal.

* * * * *